Figure 1:
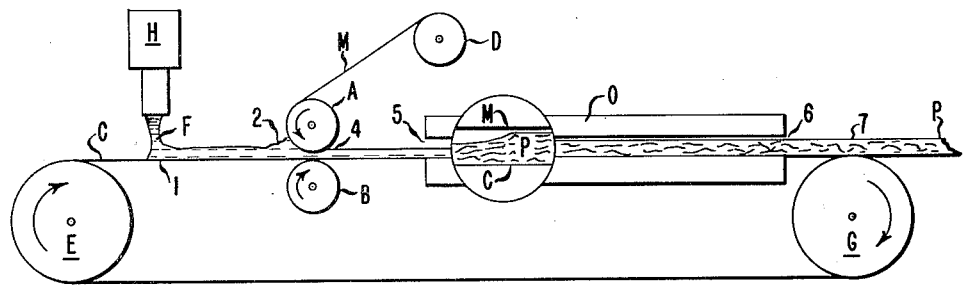

July 31, 1962  G. W. COBLE  3,047,449
PROCESS FOR PREPARING A THIN CELLULAR POLYURETHANE
LAYER OF UNIFORM THICKNESS
Filed Jan. 16, 1958

INVENTOR
GEORGE WILLIAM COBLE
BY Walter H. Steinbauer Jr.
ATTORNEY

United States Patent Office 3,047,449
Patented July 31, 1962

3,047,449
PROCESS FOR PREPARING A THIN CELLULAR POLYURETHANE LAYER OF UNIFORM THICKNESS
George W. Coble, Nashville, Tenn., assignor to E. I. du Pont de Nemours and Company, Wilmington, Del., a corporation of Delaware
Filed Jan. 16, 1958, Ser. No. 709,390
8 Claims. (Cl. 156—79)

This invention is directed to a novel process for preparing thin sections of polyurethane foam and for applying a thin backing of polyurethane foam to rugs, fabrics, paper, films, and metal foil.

Urethane foam backing imparts new value to many familiar objects. Rugs, for example, acquire a more luxurious feel. Foam-coated aluminum foil and paper can be used for insulation. Foam-backed fabrics may be employed to make better upholstery.

The difficulties in applying a foam coating of uniform thickness by conventional techniques have limited the use of polyurethane foam backing in the trade. For example, a foamable polyisocyanate composition can be applied to rug backing by spraying or by a doctor blade technique; however, the first method does not distribute the coating evenly enough and the second method is handicapped by the undesired generation of foam on the doctor blade. Similar problems are met when coating films, foils, fabric, paper and the like.

It is therefore an object of the present invention to provide a process for applying a thin uniform coating of a polyurethane foam to a flexible surface. It is a further object to provide a process for applying a rug backing of polyurethane foam having significant smoothness of surface and uniformity of thickness. It is a still further object to provide a process for preparing polyurethane foam in thin sections.

More specifically, the present invention is directed to a process for forming a relatively thin cellular structure between two sheets of flexible material by passing the two superimposed sheets horizontally through a pair of rollers at the same speed, introducing a foamable mixture containing an isocyanate-terminated polyurethane, water, and a tertiary amine catalyst onto one sheet prior to positioning the other sheet and prior to passage through the rolls, whereby on passage through the rolls the foamable mixture is spread uniformly between the top and bottom sheets, and thereafter passing the composite structure through a heated zone wherein said mixture expands to give a cellular structure. If desired, one or both sheets may be stripped from the composite structure.

The present novel process can be used for producing very thin sheets of resilient polyurethane foam or for applying a thin layer of this foam to flexible sheets. The foam may be bound to one side of a flexible material to provide a resilient backing. It may be the center layer of a composite sandwich structure. The process may be carried out either in a continuous manner or in batch fashion.

When very thin sheets of polyurethane foam are made by this process, the foamable composition is uniformly spread between flexible sheets to which it cannot become strongly bonded. After the cellular structure has formed and become tack-free, it is stripped away from these carriers. A light net such as a fish net having about ¼-inch space between the threads may be fed between the flexible carrier sheets before they emerge from the nip of the rolls as a composite structure containing the foamable composition. This net becomes an integral part of the polyurethane foam and gives it improved dimensional stability. The removable sheets are either made from materials (such as polyethylene or "Teflon" polytetrafluoroethylene) to which polyurethane resins do not adhere well, or, their surfaces have been coated with a high melting wax or polyethylene or mold release agents such as "Nalco" RA-1 (commercially available from the National Aluminate Co.). The thin sheets of resilient polyurethane foam produced this way are particularly useful for clothing inner-liners. For example, jackets providing desirable protection against cold winter weather may have incorporated therein a lining of resilient polyurethane foam.

The present process can be operated so that one sheet becomes strongly bonded to the foam while the other sheet may be easily stripped away. This embodiment is particularly valuable since it is useful for applying foam backing to rugs, fabrics, metallic foils, paper, plastic films and the like.

If desired, both the sheets may be materials which become strongly bonded to the foam and they need not be the same. A wide variety of composite structures may thus be produced. For example, resilient polyurethane foam can be bonded to leather and cotton fabric.

The coating operation is generally carried out at or near room temperature. In some cases the viscosity of the foamable composition may be a trifle high at room temperature for optimum convenience; then, the rollers may be maintained at a slightly elevated temperature such as 35° C. The temperature of the heated zone will influence the rate at which the cellular structure is formed from the foamable composition. The maximum temperature permitted will be that at which expansion can occur without rupture of the cell walls and subsequent collapse. If a series of heated zones is used, the foam may be formed in one zone at this limiting temperature and then cured by passage through progressively hotter zones.

The time required to expand and cure the foam and the length of the heated zone will set a limit on the speed at which the flexible sheets can travel. A heated zone temperature of about 70° C. has been found to be satisfactory. At least 20 minutes is required for many of the cellular structures to form and become tack-free at this temperature. In that case, if the heated zone is 100 feet long, the flexible sheets will not be able to travel any faster than about 5 feet per minute. If the cellular structures become tack-free in less time, the sheets may move more rapidly. It is to be understood that the speed is also governed by the capacity available for depositing the foamable composition at the first stage in the process.

Figure 2:
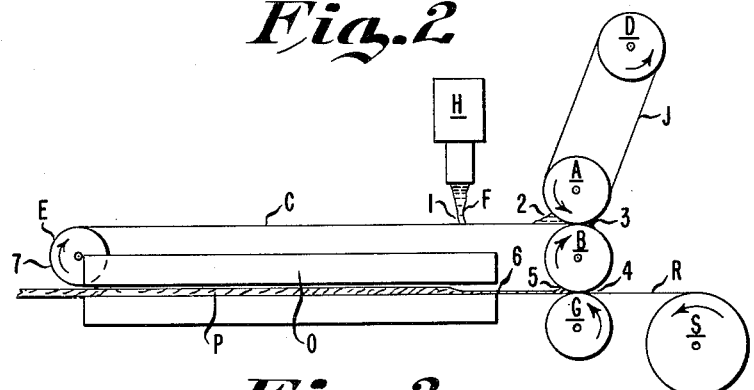
Figure 3:
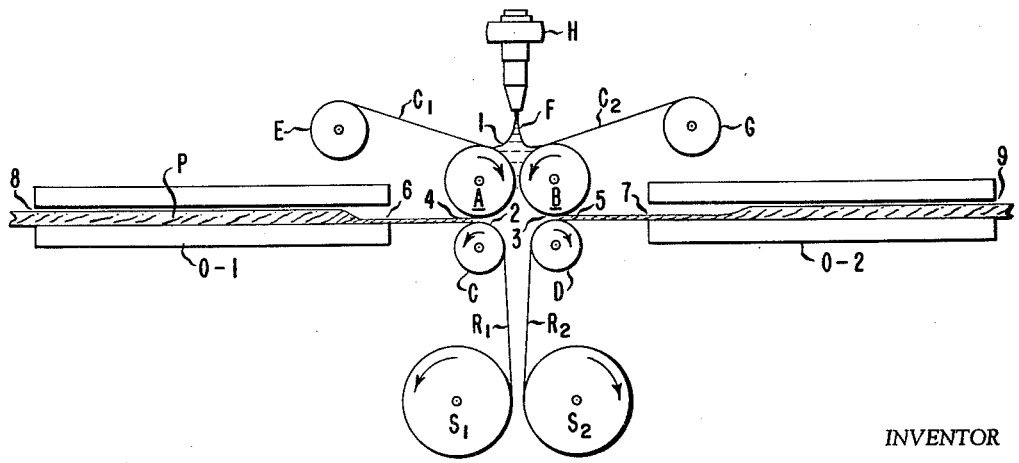

FIGURES 1 through 3 illustrate representative embodiments of the subject invention, FIGURE 1 setting forth an embodiment wherein a foamable composition F is deposited at about room temperature from a traversing mixing head H onto an endless conveyor belt C at 1 which carries it between the nip of coacting rolls A and B at 2 where a small rolling bank of F is maintained. Sheet M, which is to be coated, unwinds across roll A and comes between roll A and carrier C at 2. The space between A and B is adjusted to apply a uniform thin coating of F to M. C, F, and M emerge in mutual contact at 4. The composite structure enters an oven O at 5. The heat present accelerates the foaming of F to produce a cellular layer P between M and C which becomes tack-free during the remainder of its passage through O. The laminae emerge from O at 6. If the surface of C has been treated with a foam release agent, P is strpped from C at 7.

The speed with which mixing head H moves back and forth across the width of carrier C and its output of foamable composition F are adjusted to maintain a small uniform rolling bank at 2. The bite of rolls A and B employed takes into account the thickness of C and M, the density of the foam produced by the coating composition, and the thickness of the cellular coating desired. When a coating composition producing a foam with a density of about 3 to 4 lb./cu.ft. is used, a film thickness from about 0.01 to 0.03 inch will produce a foam from about 0.12 to 1.0 inch in thickness.

M and C should move at the same speed in order to avoid exerting a shearing action on the foamable composition (and later the newly-formed cellular structure) situated between them. It is convenient if rolls A and B have the same diameter but it is not necessary. They must turn in opposite directions.

FIGURE 2 shows another embodiment adapted for applying a cellular coating to rug backing. Rolls A and G turn counter clockwise; roll B turns clockwise; it is convenient if they all have the same diameter but it is not necessary. The foamable composition F is deposited from a traversing mixing head H onto carrier C at 1. The deposited mixture travels between the bite of rolls A and B at 2 where a small rolling bank of F is maintained. There F is distributed between C and an endless belt J which moves about a tenth as fast as C. C receives most of F. C emerges at 3 evenly coated with F and is drawn by roll B into the bite between rolls B and E at 4. There C, F, and the backing of rug R are brought into uniform mutual contact. The composite structure emerges from the rolls at 5 and enters oven O at 6. The heat present accelerates the formation of a cellular structure from F. The foam is cured during the remainder of its trip through O and is stripped from C at 7.

FIGURE 3 shows still another embodiment which is particularly suitable for applying resilient polyurethane foam to rug backing. Carriers $C_1$ and $C_2$ are kraft paper coated with a foam release agent. Rolls A and B are of equal size; the same is true for rolls C and D. Roll A is shown in FIGURE 3 to be larger in diameter than roll C; however, it may be the same size or smaller. Rolls A and D turn clockwise; rolls B and C turn counterclockwise. Carriers $C_1$ and $C_2$ and rugs $R_1$ and $R_2$ move at the same rate.

Carriers $C_1$ and $C_2$ unwind from rolls E and G, respectively, and pass between the bite of rolls A and B at 1 where a rolling bank of the foamable composition F is maintained by the traversing mixing head H. $C_1$ and $C_2$ emerge evenly coated and are carried by the rotation of rolls A and B to 2 and 3, respectively. Rug $R_1$ enters the bite between rolls A and C where its backing evenly contacts the coated carrier $C_1$ at 2. The mutually contacting layers emerge from the bite at 4 and are drawn to 6 where they enter oven O–1. The heat in O–1 causes the foamable composition F to expand rapidly to a cellular structure P which becomes bonded to $R_1$ and is cured. The composite structure emerges at 8. The carrier $C_1$ may then be stripped from the foam. The backing of rug $R_2$ is similarly coated with a cellular structure by contacting a coated carrier $C_2$ at 3 and heating in oven O–2 the mutually contacting layers which emerge at 5.

As little foaming as possible should occur before the coated sheets enter the heated zone. Otherwise, fouling of the rolls will take place and it will be difficult to apply a uniform coating. This requirement is best met by employing an isocyanate composition free from catalytic impurities and by using a thermally activated catalyst, i.e., one which has to be heated above room temperature to be effective. Certain water-soluble tertiary amines substituted by an amide group are suitable. Representative examples are 3-morpholinopropionamide (I) and 2-diethylaminoacetamide (II), and, 2-methyl-3-diethylaminopropionamide.

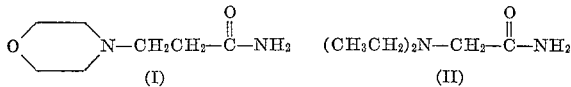

About 1–2% of these catalysts is used by weight of the foamable composition. Another type of thermally activated catalyst which may be used is a water soluble salt made by reacting a carboxylic acid of first pKa 3–5 with a tertiary amine of pKb 3–7. Representative examples are trimethylamine formate, trimethylamine acetate, triethylamine formate, triethylamine acetate, N-methylmorpholine acetate, N-methylmorpholine citrate, trimethylamine ethylenediamine tetraacetate, and trimethylamine imino triacetate. The amount of catalyst used is based on the tertiary amine available as the salt. The recommended catalyst concentration introduces 0.25 to 1.1% available tertiary amine per 100 parts of the foamable composition.

The foregoing catalysts are very active at 70° C. It is recommended that the heated zone be maintained at a temperature between about 60 to 70° C. when they are used. The preferred temperature is 65° C.

It is to be understood that catalysts active at room temperature may be employed when the roll coating procedure is sufficiently rapid to minimize the occurrence of foaming until the coated sheets enter the heated zone; correspondingly, less time in the heated zone will be needed for the isocyanate composition to foam and to become tack-free. Triethylamine, trimethylamine, N-methylmorpholine, 3-diethylaminopropionamide, diethylethanolamine, dimethylethanolamine, and, diethanolamine are representative examples of tertiary amines active at room temperature which are suitable for use in the present process.

The isocyanate coating is foamed by the reaction of its free isocyanate groups with water. Theoretically, one molecule of water reacts with two isocyanate groups. Water is added to supply 100 to 300% of this requirement; 120 to 200% is preferred. Dispersion may be improved by incorporating surfactants such as ethylene oxide condensation products. The addition of silicones such as polydimethylsiloxane (50 centistokes grade) is helpful in obtaining a finer cell structure in the ultimate product.

In general, the isocyanate-terminated polyurethanes are made by agitating organic polyols and arylene diisocyanates in such proportions that the over-all ratio of the number of free isocyanate groups to the number of hydroxyl groups is greater than 1.0. If desired, the reaction may be carried out in several steps—one or more of which may produce hydroxyl-terminated polyurethanes prior to the final step. The one-step process requires about 1–2 hours at 90° C. or about 1.5–4 hours at 80° C. or about 4–8 hours at 70° C. Optionally, temperatures up to about 150° C. may be employed to introduce additional cross-linking by reactions such as allophanate formation. The progress of the reaction may be followed by determining the free isocyanate content of the mixture. Finally, the prepolymers obtained are standardized to the desired (usually 8–13% by weight) free isocyanate content by addition of more diisocyanate.

Polyols useful in preparing the foamable compositions are: polyalkyleneether glycols, polyalkyleneether thioether glycols, polyalkylenearyleneether glycols, poyaliphatic hydrocarbon diols, and polyesters containing a plurality of alcoholic hydroxyl groups.

The useful polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 750 to 10,000. Not all of the alkylene radicals need to be the same. The preferred polyalkyleneether glycols have molecular weights, ranging from about 1000 to 4000. Representative examples of these glycols are poly-1,2-propyleneether glycol, 1,2-polydimethylethyleneether glycol, ethylene oxide-modified poly-1,2-propyleneether glycol, polytetramethyleneether glycol (as known as poly n-butyleneether glycol), polypentamethyleneether glycol, and polytetramethyleneformal glycol. These polyalkyleneether glycols are made by the polymerization of cyclic ethers such as alkylene oxides or dioxolane or by condensation of the glycols.

Another class of polymeric glycols which may be used are the polyalkyleneether-thioether glycols which may be represented by the formula HO(GY)$_n$H, wherein G represents hydrocarbon radicals at least some of which are alkylene, Y represents chalcogen atoms some of which are sulfur and the rest oxygen, and $n$ is an integer sufficiently large so that the glycol has a molecular weight of about 750 to 10,000.

The following compounds are representative examples:

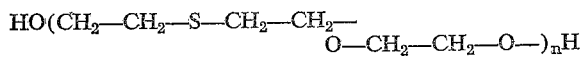

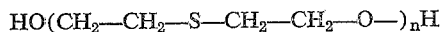

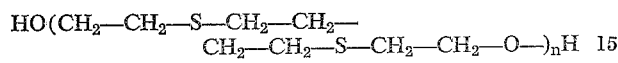

Their preparation is described in French Patent 1,128,561.

Another useful class of glycols are the polyalkylene-arylene ether glycols. These glycols are similar to the polyalkyleneether glycols except that some arylene radicals are present. The phenylene, naphthalene and anthracene radicals may be used with or without substituents such as alkyl or alkylene groups, and, in general, there should be at least one alkyleneether radical having a molecular weight of about 500 for each arylene radical which is present. When part of the ether oxygens are replaced with sulfur, a polyalkylene-arylene-ether-thioether glycol results, which also may be used in the present invention.

Still another useful class of glycols are the hydroxyl-terminated polyaliphatic hydrocarbons. The aliphatic portion of these polymers may be saturated or there may be chain and side-chain ethylenic unsaturation present. Representative examples are

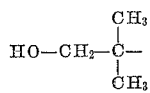

terminated polyisoprene and

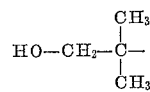

terminated polybutadiene. Procedures for making this type of diol are disclosed in French Patent 1,139,630.

The polyesters containing a plurality of hydroxyl groups which are useful in the present invention are made by the usual methods of condensation polymerization from organic molecules containing two alcoholic hydroxyl groups and a dicarboxylic acid (e.g., 1,4-butanediol and adipic acid); optionally a small amount of an organic trihydric compound (e.g., trimethylol propane) may be included to provide cross-linking; one molar equivalent of triol for each 3000 to 12000 molecular weight of polyester is recommended.

Representative examples of useful diols are ethylene glycol, 1,2-propylene glycol, 1,3-propanediol, 1,2-butylene glycol, 1,4-butanediol, thiodiglycol, diethyleneglycol, triethylene glycol, and 1,2-alkylene oxide modified glycols such as

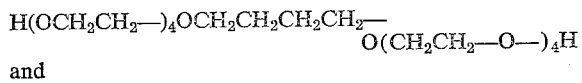

and

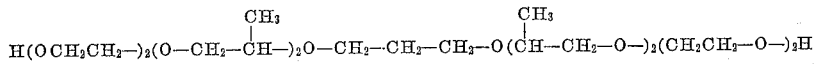

Representative examples of useful polyhydric compounds are glycerol, trimethylolpropane, trimethylolethane, pentaerythritol, and 1,2-alkylene oxide modified glycerol. Representative examples of useful dicarboxylic acids are oxalic acid, adipic acid, malonic acid, succinic acid, glutaric acid, pimelic acid, suberic acid, azelaic acid, sebacic acid, fumaric acid, maleic acid, and phthalic acid. Anhydrides of dicarboxylic acids may be employed in place of the acids; succinic anhydride and phthalic anhydride are representative examples.

The measurements on the properties of the cured foams are done in accordance with the following ASTM methods: compression set by ASTM D-395-59T, Method B; compression modulus by ASTM D-575-46, Method B.

The tensile strength measurements are carried out with an "Accrometer" (Scott Testers Co.) set for a 100-pound load. The foam specimens are cemented to aluminum plugs which contain stems gripped by the testing machine. The samples are drawn at a head speed of 2 inches per minute. The foam pellets are one inch high and 1.129 inches in diameter. The aluminum plugs are a half-inch high and 1.129 inches in diameter. Each plug is equipped with a stem one inch long.

The following representative examples illustrate the present invention.

EXAMPLE 1

(A) *Preparation of Prepolymer 1-A*

Prepolymer 1-A is made in a dry reaction vessel protected from atmospheric moisture. 3000 parts of polytetramethyleneether glycol of number-average molecular weight 3000 (water content less than 0.05% by weight) and 348 parts of a mixture 80% toluene-2,4-diisocyanate and 20% toluene-2,6-diisocyanate are agitated at 60° C. for 2 hours. An additional 35 parts of the toluenediisocyanate isomer mixture is introduced and the mass is agitated at 140° C. for 2 hours. It is then cooled to room temperature and standardized to 9.5% free isocyanate content by the addition of 131 parts of the toluenediisocyanate isomer mixture.

(B) *Preparation of Catalysts*

3-morpholinopropionamide is prepared by the addition of morpholine to acrylamide according to the procedure of Erickson [J. Am. Chem. Soc. 74, 6282 (1952)]. 2-methyl-3-diethylaminopropionamide is made from diethylamine and 2-methacrylamide by the above procedure. 2-dimethylaminoacetamide is made by treating dimethylaminoacetonitrile with 96% sulfuric acid at room temperature.

(C) *Preparation of Catalyst Solutions (1-A, 1-B, 1-C)*

10 parts of 3-morpholinopropionamide is mixed at room temperature with 10 parts of water to obtain catalyst solution 1-A. Catalyst solutions 1-B and 1-C are prepared, respectively, by mixing 2-methyl-3-diethylaminopropionamide and 2-dimethylaminoacetamide with water in the same way as 3-morpholinopropionamide.

(D) *Preparation of Masterbatch (1-A)*

100 parts of prepolymer 1-A is mixed with 0.5 part of polydimethylsiloxane (50 centistokes grade) and 1.0 part of an emulsifying agent (commercially available from the Wyandotte Chemicals Co. as "Pluronic" L81) which is understood to be the condensation product of polypropyleneether glycol (of molecular weight about 2300) with 6 molar equivalents of ethylene oxide.

(E) *Equipment*

FIGURE 1 depicts the equipment used. Rolls E and G, which are 10 inches in diameter and 30 inches in width, turn in a clockwise direction to move the canvas (polyethylene coated) conveyor belt C at a speed of 5 feet per minute. The mixing head H is located about 4 inches above the conveyor. Rolls A and B, which are 5 inches in diameter, move counterclockwise and clockwise, respectively. Roll D contains kraft paper which is unwound at the rate of 10 feet per minute. Oven O, which is 50 feet long, is maintained at about 65° C.

(F) *Coating the Kraft Paper With Resilient Polyurethane Foam*

Masterbatch 1-A and catalyst solution 1-A are pumped at 30° C. by separate streams to the mixing head H at such a rate that for every 101.5 parts by weight of Masterbatch 1–A delivered, 3.0 parts of catalyst solution 1–A and 0.7 part of water are supplied. The mixture F is immediately discharged from H onto C at 1. F is carried between the bite of rolls A and B where at 2 it contacts the kraft paper M. The distance between A and B is adjusted so that a uniform coating 0.03 inch thick is applied to M. The output of H is regulated in order to minimize the rolling bank of F at 2.

The mutually contacting paper, coating, and carrier enter oven O at 5. The temperature of oven O is 65° C. The heat accelerates the foaming of F and a resilient cellular layer about 1 inch thick is formed between the paper and the carrier. The composite structure emerges from the oven 20 minutes later; the foam-backed kraft paper is striped from the carrier at 7. The foam has the following properties:

| | |
|---|---|
| Density (lb./cu. ft.) | 4.0 |
| (25° C.) tensile strength (lb./sq. in.) | 25 |
| Elongation at break (percent) | 150 |
| (25° C.) compression modulus (lb./sq. in.) at: | |
| 20% deflection | 1.0 |
| 40% deflection | 1.3 |
| 60% deflection | 2.5 |
| 80% deflection | 8.2 |
| (70° C.) compression set (percent) | 15 |

(G) When catalyst solution 1–B is substituted for catalyst solution 1–A in the procedure of part F, essentially the same result is obtained.

(H) When catalyst solution 1–C is substituted for catalyst solution 1–A in the procedure of part F, substantially the same result is obtained.

(I) When cotton duck is substituted for the kraft paper in the procedure of part F, a one-inch backing of resilient polyurethane foam is applied.

(J) When nylon is substituted for the kraft paper in the procedure of part G, a one-inch backing of flexible cellular material is applied.

(K) When aluminum foil is substituted for the kraft paper in the procedure of part H, it becomes coated with a one-inch foam.

EXAMPLE 2

(A) *Preparation of Prepolymer (2–A)*

75 parts of polypropyleneether glycol of molecular weight 2000, 25 parts of a tetrol made by reacting ethylenediamine with 44 molar equivalents of 1,2-propylene oxide and then with 11 molar equivalents of ethylene oxide (commercially available as "Tetronic" 701 from the Wyandotte Chemicals Corporation), 0.02 part of polydimethylsiloxane (50 centistoke grade), and 0.3 part of water are stirred together for 20 minutes at room temperature. Then 16 parts of an 80:20 mixture of toluene-2,4- and toluene-2,6-diisocyanate is introduced. Heat is evolved. After the temperature of the mass begins to drop, external heat is applied. The reactants are agitated for 2 hours at a temperature of 100° C. Then 23.4 additional parts of the toluenediisocyanate mixture is introduced with stirring. External cooling is applied and the temperature of the mass is quickly lowered to about 30° C. Prepolymer 2–A thus obtained has a free isocyanate content of about 8.5%.

(B) *Preparation of Masterbatch (2–A)*

100 parts of prepolymer 2–A is mixed with 0.5 part of polydimethylsiloxane (50 centistokes grade).

(C) *Coating Kraft Paper with Resilient Polyurethane Foam*

The process described in part F of Example 1 is repeated except that Masterbatch 2–A is used in place of Masterbatch 1–A; 3.0 parts of catalyst solution 1–A and 0.5 part of water are supplied for every 100.5 parts by weight of Masterbatch 2–A pumped to mixing head H.

The kraft paper is coated with a resilient foam backing which has the following properties:

| | |
|---|---|
| Density (lb./cu.ft.) | 3.5 |
| (25° C.) Tensile strength (lb./sq.in.) | 22 |
| Elongation at break (percent) | 250 |
| (25° C.) Compression modulus (lbs./sq.in.) at: | |
| 20% deflection | 0.7 |
| 40% deflection | 0.9 |
| 60% deflection | 1.5 |
| 80% deflection | 5.6 |
| (70° C.) compression set (percent) | 18 |

(D) *Coating "Mylar" Polyester Film*

When "Mylar" polyester film is substituted for kraft paper in the procedure of part B above, a foam backing about ¾ inch thick is applied.

EXAMPLE 3

(A) *Preparation of Prepolymer (3–A)*

75 parts of a polypropyleneether glycol of molecular weight about 1650 modified by reaction with about 4 moles of ethylene oxide (commercially available as "Pluronic" L–61 from the Wyandotte Chemicals Corp.), 25 parts of a tetrol made by reacting ethylenediamine with about 44 molar equivalents of 1,2-propylene oxide and then 11 molar equivalents of ethylene oxide (commercially available as "Tetronic" 701 from the Wyandotte Chemicals Corp.), 0.02 part of polydimethylsiloxane (50 centistoke grade), and 0.3 part of water are stirred together for 20 minutes at room temperature. Then 15 parts of an 80:20 mixture of toluene-2,4- and toluene-2,6-diisocyanate is introduced. Heat is evolved. After the temperature of the mass begins to drop, external heat is applied. The reactants are agitated for 2 hours at a temperature of 80° C. Then 25 parts of the toluenediisocyanate mixture is introduced with stirring. External cooling is applied and the temperature of the mass is quickly lowered to about 30° C. Prepolymer 3–A thus obtained has a free isocyanate content of about 9.3%.

(B) *Preparation of Masterbatch (3–A)*

100 parts of prepolymer 3–A is mixed with 0.5 part of polydimethylsiloxane (50 centistokes grade) and 1.0 part of an emulsifying agent (commercially available from the Wyandotte Chemicals Co. as "Pluronic" L81) which is understood to be the condensation product of 1 mole of polypropyleneether glycol (of molecular weight about 2300) with about 6 moles of ethylene oxide.

(C) *Equipment*

The equipment depicted by FIGURE 2 is used. Rolls E and B, which are 30 inches wide and 5 inches in diameter, turn clockwise moving conveyor C at a speed of about 5 feet per minute. Mixing head H is located about 4 inches above C. Rolls A and D, which are 5 inches in diameter, turn counter-clockwise moving conveyor J at a speed of 6 inches per minute. Roll G, which is 3 inches in diameter, turns counter-clockwise. Rolls B and E revolve at the same rate. Oven O, which is 50 feet long, is maintained at 65° C.

(D) *Application of Foam Backing to a Rug*

Masterbatch 3–A at 30° C. and catalyst solution 1–A are pumped by separate streams to the mixing head H at such a rate that for every 100 parts by weight of prepolymer 3–A 1.5 parts of catalyst 1–A and 2.2 parts of water are supplied. The mixture F is immediately discharged from H onto C at 1. It is spread out into a uniform thin film when C passes between the bite of rollers A and B at 2. The underside of a rug R uniformly contacts the coated carrier at 4 as it goes between rollers B and G. The coated rug emerging at 5 enters the oven O at 6 where the heat causes the coating to expand to a cellular layer. The foam becomes tack-free during the remainder of its passage through O. The foam-backed rug is separated from the carrier at 7.

EXAMPLE 4

(A) *Preparation of Prepolymer (4–A)*

70 parts of a hydroxyl-terminated polyester of molecular weight of about 1800 (made from 1,4-butanediol and adipic acid) and 30 parts of a toluenediisocyanate isomer mixture (80% 2,4- and 20% 2,6-) are agitated for 1 hour. Then over a period of 1 hour heat is applied and the temperature of the mass is brought to 100° C. The mixture is stirred at 100° C. for 1 hour. The prepolymer obtained has a free isocyanate content of 10.5%.

(B) *Preparation of Masterbatch (4–B)*

100 parts of prepolymer 4–A is mixed with 0.5 part of an emulsifying agent (commercially available from the Wyandotte Chemicals Co. as "Pluronic" L–72) which is understood to be the condensation product of 1 mole of polypropyleneether glycol (of molecular weight about 1950) with about 11 moles of ethylene oxide, and 1.0 part of an emulsifying agent of ethylene oxide, and 1.0 part of an emulsifying agent (commercially available from the Wyandotte Chemicals Co. as "Pluronic" L–62) which is understood to be the condensation product of 1 mole of polypropyleneether glycol (of molecular weight about 1650) with about 9.4 moles of ethylene oxide.

(C) *Equipment*

The equipment used is described in part E of Example 1 and is depicted by FIGURE 1.

(D) *Preparing a Thin Section*

Masterbatch 4–A and catalyst solution 1–A are pumped at 30° C. by separate streams to the mixing head H at a rate such that for every 101.5 parts by weight of Masterbatch 4–A delivered, 3.0 parts of catalyst solution 1–A and 1.5 parts of water are supplied. The mixture F is immediately discharged from H onto C at 1. The bite of the rolls A and B is adjusted so that a uniform coating 0.01 inch thick is applied to the kraft paper M. The coating procedure of part F of Example 1 is followed except that the surface of the kraft paper is pretreated with a thin coating of a high melting wax before it is contacted by the foamable composition. After the composite structure emerges from the oven, the foam is obtained by stripping away both sheets of kraft paper. The resilient sheet of polyurethane foam is about 0.1 inch thick and has the following properties:

| | |
|---|---|
| Density (lb./cu. ft.) | 3.0 |
| (25° C.) Tensile strength (lb./sq. in.) | 40.9 |
| (25° C.) Elongation at break (percent) | 304 |
| (25° C.) Compression modulus (lb./sq. in.) at: | |
| 20% deflection | 1.1 |
| 40% deflection | 2.2 |
| 60% deflection | 13.0 |
| 80% deflection | 18.0 |
| (70° C.) compression set (percent) | 0.3 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for forming a thin cellular layer between two sheets of flexible material wherein two superimposed sheets of said flexible material are horizontally passed, at the same speed, through a pair of rollers preceded by introducing a foamable mixture containing an isocyanate-terminated polyurethane, water, and a tertiary amine between said sheets prior to passing said sheets with interdeposed foamable mixture through said rolls, said foamable mixture being spread uniformly between said flexible sheets followed by passing said sheets and interdeposed foamable mixture through a heated zone maintained at a temperature between about 55 to 75° C. wherein said mixture expands to form a thin uniform cellular layer between said flexible sheets.

2. A process for forming a thin cellular layer between two sheets of flexible material wherein two superimposed sheets of said flexible material are horizontally passed, at the same speed, through a pair of rollers preceded by introducing a foamable mixture containing an isocyanate-terminated polyurethane, water, and a tertiary amine between said sheets prior to passing said sheets with interdeposed foamable mixture through said rolls, said foamable mixture being spread uniformly between said flexible sheets followed by passing said sheets and interdeposed foamable mixture through a heated zone maintained at a temperature between about 55 to 75° C. wherein said mixture expands to form a thin uniform cellular layer between said flexible sheets, followed by stripping one sheet from the resulting product.

3. A process for forming a thin cellular layer between two sheets of flexible material wherein two superimposed sheets of said flexible material are horizontally passed, at the same speed, through a pair of rollers preceded by introducing a foamable mixture containing an isocyanate-terminated polyurethane, water, and a 3-dialkylaminopropionamide between said sheets prior to passing said sheets with interdeposed foamable mixture through said rolls, said foamable mixture being spread uniformly between said flexible sheets followed by passing said sheets and interdeposed foamable mixture through a heated zone maintained at a temperature between about 55 to 75° C. wherein said mixture expands to form a thin uniform cellular layer between said flexible sheets.

4. A process for forming a thin cellular layer between two sheets of flexible material wherein two superimposed sheets of said flexible material are horizontally passed, at the same speed, through a pair of rollers preceded by introducing a foamable mixture containing an isocyanate-terminated polyurethane, water, and a 3-dialkylaminopropionamide between said sheets prior to passing said sheets with interdeposed foamable mixture through said rolls, said foamable mixture being spread uniformly between said flexible sheets followed by passing said sheets and interdeposed foamable mixture through a heated zone maintained at a temperature between about 55 to 75° C. wherein said mixture expands to form a thin uniform cellular layer between said flexible sheets, followed by stripping one sheet from the resulting product.

5. The process of claim 4 wherein the sheet removed is polyethylene.

6. The process of claim 4 wherein the 3-dialkylaminopropionamide is 3-morpholinopropionamide.

7. A process for forming a thin cellular layer between two sheets of flexible material wherein two superimposed sheets of said flexible material are horizontally passed, at the same speed, through a pair of rollers preceded by introducing a foamable mixture containing an isocyanate-terminated polyurethane, water, and a tertiary amine between said sheets prior to passing said sheets with interdeposed foamable mixture through said rolls, said foamable mixture being spread uniformly between said flexible sheets followed by passing said sheets and interdeposed foamable mixture through a heated zone maintained at a temperature between about 55 to 75° C. wherein said mixture expands to form a thin uniform cellular layer between said flexible sheets, followed by stripping both sheets from said cellular layer.

8. A process for forming a thin cellular layer between two sheets of flexible material wherein two superimposed sheets of said flexible material are horizontally passed, at the same speed, through a pair of rollers preceded by introducing a foamable mixture containing an isocyanate-terminated polyurethane, water, and a 3-dialkylamino-proprionamide between said sheets prior to passing said sheets with interdeposed foamable mixture through said rolls, said foamable mixture being spread uniformly between said flexible sheets followed by passing said sheets and interdeposed foamable mixture through a heated zone maintained at a temperature between about 55 to 75° C. wherein said mixture expands to form a thin uniform cellular layer between said flexible sheets, followed by stripping both sheets from said cellular layer.

References Cited in the file of this patent

UNITED STATES PATENTS

| | | |
|---|---|---|
| 2,460,571 | Chaffee | Feb. 1, 1949 |
| 2,496,911 | Green | Feb. 7, 1950 |
| 2,841,205 | Bird | July 1, 1958 |
| 2,841,515 | Runton | July 1, 1958 |
| 2,850,467 | Livingood | Sept. 2, 1958 |
| 2,888,360 | Sherts et al. | May 26, 1959 |

FOREIGN PATENTS

| | | |
|---|---|---|
| 167,675 | Australia | July 23, 1953 |
| 842,267 | Germany | Sept. 15, 1952 |